United States Patent
Huang et al.

(10) Patent No.: US 9,932,089 B2
(45) Date of Patent: Apr. 3, 2018

(54) SINGLE-WHEEL ELECTRIC BALANCING SCOOTER

(71) Applicant: ZHEJIANG LINIX MOTOR CO., LTD, Dongyang, Zhejiang (CN)

(72) Inventors: Haiyan Huang, Zhejiang (CN); Xiaoren Jin, Zhejiang (CN); Xiaoding Ruan, Zhejiang (CN); Haiping Liu, Zhejiang (CN); Lei Zhen, Zhejiang (CN); Lihui Zhang, Zhejiang (CN); Wenming Zhen, Zhejiang (CN); Guanjun Jin, Zhejiang (CN); Yan Wen, Zhejiang (CN)

(73) Assignee: ZHEJIANG LINIX MOTOR CO., LTD, Dongyang, Zhejiang (CN)

( * ) Notice: Subject to any disclaimer, the term of this patent is extended or adjusted under 35 U.S.C. 154(b) by 0 days.

(21) Appl. No.: 15/097,751

(22) Filed: Apr. 13, 2016

(65) Prior Publication Data
US 2016/0304159 A1 Oct. 20, 2016

(30) Foreign Application Priority Data

Apr. 17, 2015 (CN) .......................... 2015 1 0181400

(51) Int. Cl.
*B62M 7/12* (2006.01)
*B62K 1/00* (2006.01)
(Continued)

(52) U.S. Cl.
CPC ................. *B62M 7/12* (2013.01); *B62H 1/02* (2013.01); *B62H 1/12* (2013.01); *B62J 1/12* (2013.01); *B62J 25/00* (2013.01); *B62J 27/00* (2013.01); *B62K 1/00* (2013.01); *B62K 11/007* (2016.11); *B62K 11/14* (2013.01); *B62K 15/00* (2013.01)

(58) Field of Classification Search
CPC ........ B62K 11/007; B62K 1/00; B62K 11/14; B62M 7/12; B62H 1/12; B62J 1/12
See application file for complete search history.

(56) References Cited

U.S. PATENT DOCUMENTS

| 8,662,211 | B2 * | 3/2014 | Kamiyama | ............ B62D 15/00 180/10 |
| 2011/0067940 | A1 * | 3/2011 | Takenaka | ............. B62K 11/007 180/218 |

(Continued)

*Primary Examiner* — Faye M Fleming
(74) *Attorney, Agent, or Firm* — Global IP Services; Tianhua Gu

(57) ABSTRACT

The present invention discloses a single-wheel electric balancing scooter, comprising a wheel, a driving motor located within the wheel, a battery pack serving as a power supply of the driving motor, a self-balancing control system, and a balance signal sensor. A saddle is provided above the wheel; the saddle is mounted on a rack which is connected and fixed to a fixed shaft of the wheel; a handle is provided on a front side of the wheel, with a lower end of the handle being connected to the rack; and a front end of the rack is connected with an auxiliary wheel rack and an auxiliary wheel is provided at a lower end of the auxiliary wheel rack. The present invention has the following advantages that it is easier for driving and better to control the balance of the scooter body; the scooter body may be dragged on the ground; and the scooter body may be kept upright when not in use.

20 Claims, 4 Drawing Sheets

(51) Int. Cl.
*B62K 11/14* (2006.01)
*B62J 1/12* (2006.01)
*B62J 27/00* (2006.01)
*B62H 1/12* (2006.01)
*B62H 1/02* (2006.01)
*B62J 25/00* (2006.01)
*B62K 15/00* (2006.01)
*B62K 11/00* (2006.01)

(56) References Cited

U.S. PATENT DOCUMENTS

| | | | |
|---|---|---|---|
| 2011/0175319 A1* | 7/2011 | Chen | B62K 1/00 |
| | | | 280/205 |
| 2016/0116500 A1* | 4/2016 | Kida | G01P 21/00 |
| | | | 73/1.37 |
| 2016/0185411 A1* | 6/2016 | Hadley | B62K 1/00 |
| | | | 180/210 |
| 2016/0303900 A1* | 10/2016 | Yoshino | B60B 19/003 |

* cited by examiner

SINGLE-WHEEL ELECTRIC BALANCING SCOOTER

TECHNICAL FIELD OF THE INVENTION

The present invention relates to an electric balancing scooter and in particular to a single-wheel electric balancing scooter.

BACKGROUND OF THE INVENTION

Single-wheel electric balancing scooters, as electric balancing scooters supported by a single wheel, are quite popular in consumers since they are small in size, easy to carry, environmentally friendly and energy saving. The leftward and rightward balance of single-wheel electric balancing scooters is realized in such a manner that a driver puts his/her feet respectively on pedals on two sides of the wheel, holds the scooter body by the insides of his/her calves and adjusts the center of body weight. Because the driver controls the balance of the scooter body by his/her feet and calves, it is very difficult to make the scooter body balanced, and it is hard to control the turning during running. Particularly for beginners who are inexperienced in controlling the force exertion of feet and calves and the adjustment of the center of body weight, it is difficult to achieve the balance of single-wheel electric balancing scooters and thus laborious for them to drive such single-wheel electric balancing scooters. With regard to the commercially available single-wheel electric balancing scooters, the driver is unable to control the scooter body when accidents such as power-off happen, easily resulting in unexpected collision or damage to the scooter body. When not in use, a single-wheel electric balancing scooter has to be put on the ground lying on its side, thereby causing wear on the surface of the single-wheel electric balancing scooter; and when the driver is to use the single-wheel electric balancing scooter again, he/she needs to make the single-wheel electric balancing scooter upright, thereby bringing much inconvenience. Since single-wheel electric balancing scooter cannot be dragged although it is easy to carry, carrying for a long period of time will make the driver feel laborious.

SUMMARY OF THE INVENTION

An objective of the present invention is to provide a single-wheel electric balancing scooter which is easier to drive, which can support better control of balance of the scooter body and also well control of balance of the scooter body even when accidents happen, and the scooter body of which may be dragged on the ground and may be kept upright when not in use, in order to solve the problems in the prior art.

In order to achieve this objective, the present invention employs the following technical solution. A single-wheel electric balancing scooter is provided, including a wheel, a driving motor located within the wheel, a battery pack serving as a power supply of the driving motor, a self-balancing control system, and a balance signal sensor, characterized in that a saddle is provided above the wheel; the saddle is mounted on a rack which is connected and fixed to a fixed shaft of the wheel; a handle is provided on a front side of the wheel, with a lower end of the handle being connected to the rack; and a front end of the rack is connected with an auxiliary wheel rack, with an upper end of the auxiliary wheel rack being connected in a foldable manner to the front end of the rack and an auxiliary wheel being provided at a lower end of the auxiliary wheel rack. A driver controls the leftward and rightward balance of the single-wheel electric balancing scooter by using the handle while sitting on the saddle. The handle also may be used by the driver to drag the scooter. Since the wheel of the single-wheel electric balancing scooter is much larger than usual wheels of luggage, the force required by dragging the single-wheel electric balancing scooter is much less than that required by dragging common luggage. The auxiliary wheel is helpful for keeping the single-wheel electric balancing scooter balanced when in parking, and allowing the single-wheel electric balancing scooter to get frontward and rearward balance to continuously slide when accidents such as power-off happen during running so as to ensure the safety, thereby avoiding injuries of the driver due to turnover and avoiding damage to the scooter body due to collision; furthermore, the auxiliary wheel can help the driver to get the balance of the scooter body better, thereby making the driving easier.

Preferably, the auxiliary wheel rack includes a left auxiliary wheel rack and a right auxiliary wheel rack, which are parallel to each other, and an auxiliary wheel is provided at a lower end of the left auxiliary wheel rack and a lower end of the right auxiliary wheel rack, respectively. The arrangement of the left auxiliary wheel rack and the right auxiliary wheel rack may keep the balance of the single-wheel electric balancing scooter better.

Preferably, an upper end of the left auxiliary wheel rack and an upper end of the right auxiliary wheel rack are connected in a foldable manner to the rack, and a distance between the left auxiliary wheel rack and the right auxiliary wheel rack is equal to a transverse width of the rack. Since the upper end of the left auxiliary wheel rack and the upper end of the right auxiliary wheel rack are connected in a foldable manner to the rack, and the distance between the left auxiliary wheel rack and the right auxiliary wheel rack is equal to the transverse width of the rack, the single-wheel electric balancing scooter may have a reduced occupation space and may be kept balanced when it is put lying on its back, so that the single-wheel electric balancing scooter may be put in a car trunk more conveniently.

Preferably, a lower edge of the auxiliary wheel is higher than a lower edge of the wheel. Since the lower edge of the auxiliary wheel is higher than the lower edge of the wheel, the auxiliary wheel may not contact the ground when the single-wheel electric balancing scooter is running.

Preferably, the rack includes a left rack and a right rack, which are located on two sides of the wheel, respectively, both the left rack and the right rack are of an inverted triangular structure, and a lower end of the left rack and a lower end of the right rack are fixed to two ends of the fixed shaft of the wheel, respectively; and the saddle spans over the left rack and the right rack.

Preferably, a pedal assembly, designed for a driver to step on during driving, is provided on the rack on the two sides of the wheel, respectively; and the pedal assembly consists of a backing plate connected to the rack and a horizontal pedal. With the use of a triangular rack, under a same strength, the material may be saved and the weight may be reduced to maintain the light weight of single-wheel electric balancing scooters.

Preferably, the pedal is connected in a foldable manner to the backing plate; a stopper is fixed to a lower end of the backing plate, and the stopper corresponds to a position below the pedal; and an anti-skid slot is provided on the pedal. The pedal is foldable to reduce its volume and this is convenient to put the single-wheel electric balancing scooter; and the arrangement of the anti-skid slot on the pedal may prevent the feet of the driver from skidding when the single-wheel electric balancing scooter is running in order to avoid accidents.

Preferably, a rear support is provided at a rear end of the rack, and a lower edge of the rear support is higher than the lower edge of the wheel. Since the lower edge of the rear support is higher than the lower edge of the wheel, the rear support may not contact the ground when the single-wheel electric balancing scooter is running.

Preferably, the rear support is of a rectangular structure, with an upper end of the rear support being connected in a foldable manner to the rack; an included angle α between the rear support and a vertical line is 15° to 45°; and the rear support has a width the same as that of the rack. The rear support serves to keep the balance of the single-wheel electric balancing scooter when in parking, and provides for a function of supporting when in parking. The size of the included angle α between the rear support and the vertical line influences the supporting and balancing effect of the support when in parking. Connecting in a foldable manner the rear support to the rack allows the rear support to be folded, and as a result, the single-wheel electric balancing scooter has a smaller volume and thus may be put in a car trunk.

Preferably, the handle includes a horizontal portion and a vertical portion; the horizontal portion includes a left horizontal portion and a right horizontal portion, the left horizontal portion is connected in a foldable manner to the right horizontal portion, and the connection part of the left horizontal portion and the right horizontal portion is connected to an upper end of the vertical portion; and a lower end of the vertical portion is connected in a foldable manner to the rack. Connection in a foldable manner facilitates the reduction of occupation space of the single-wheel electric balancing scooter and thus it may be put in a car trunk.

The present invention has the advantages that it is easier for the driver to drive, it can support better control of balance of the scooter body and also well control of balance of the scooter body even when accidents happen, and the scooter body may be dragged on the ground and may be kept upright when not in use so that it is convenient for the driver to use it again.

DETAILED DESCRIPTION OF THE INVENTION

The present invention will be further described as below with reference to the accompanying drawings.

Figure 1:
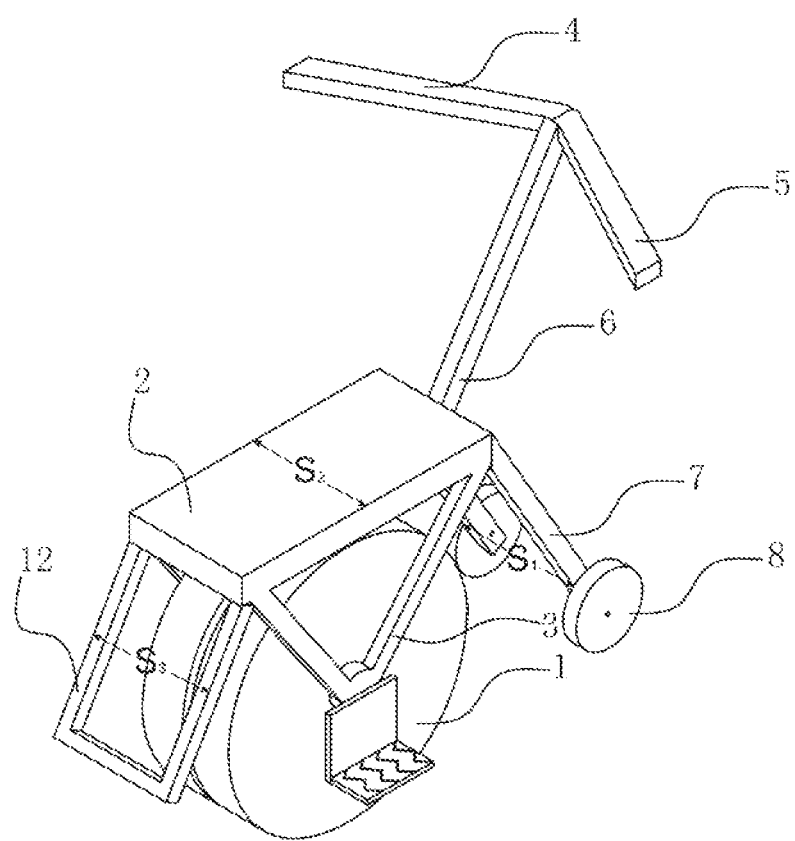
FIG. 1 is a stereoscopic view of the present invention.
Figure 2:
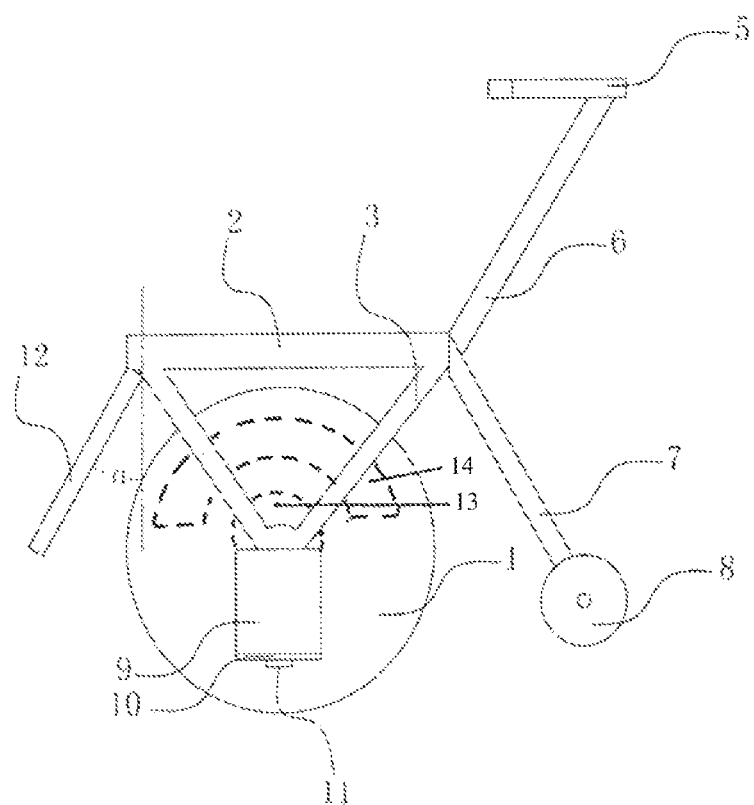
FIG. 2 is a side view of the present invention.
Figure 3:
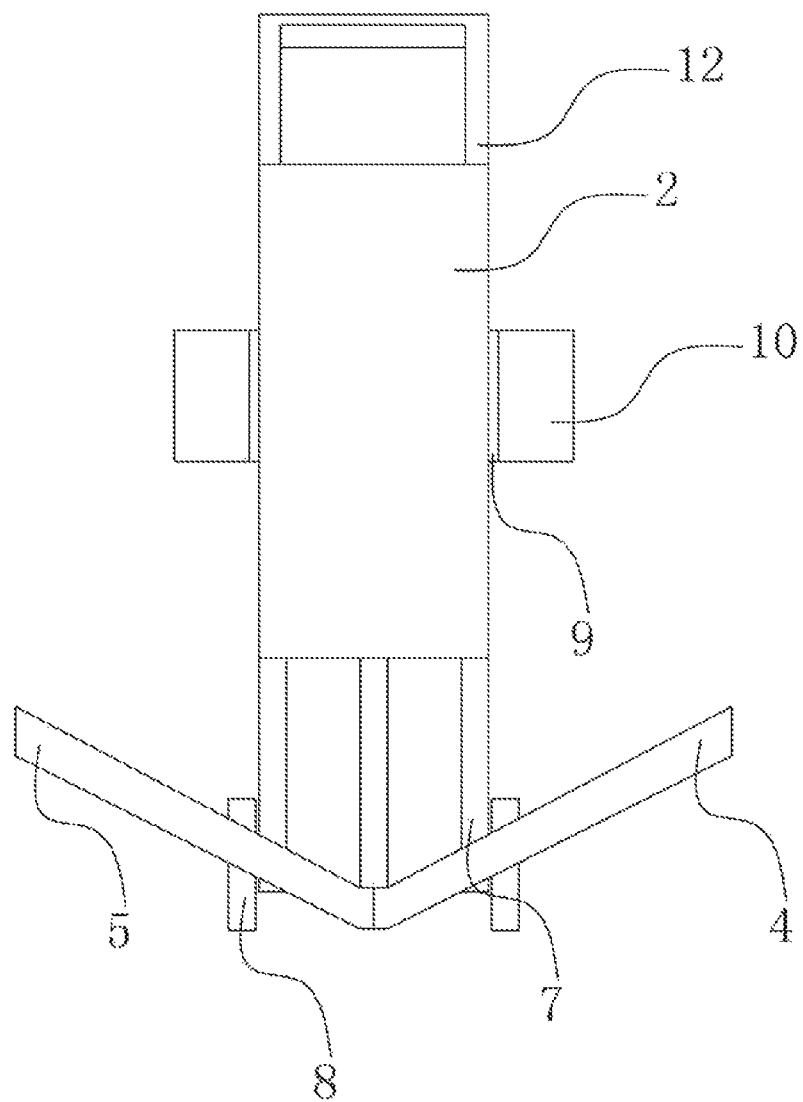
FIG. 3 is a top view of the present invention.
Figure 4:
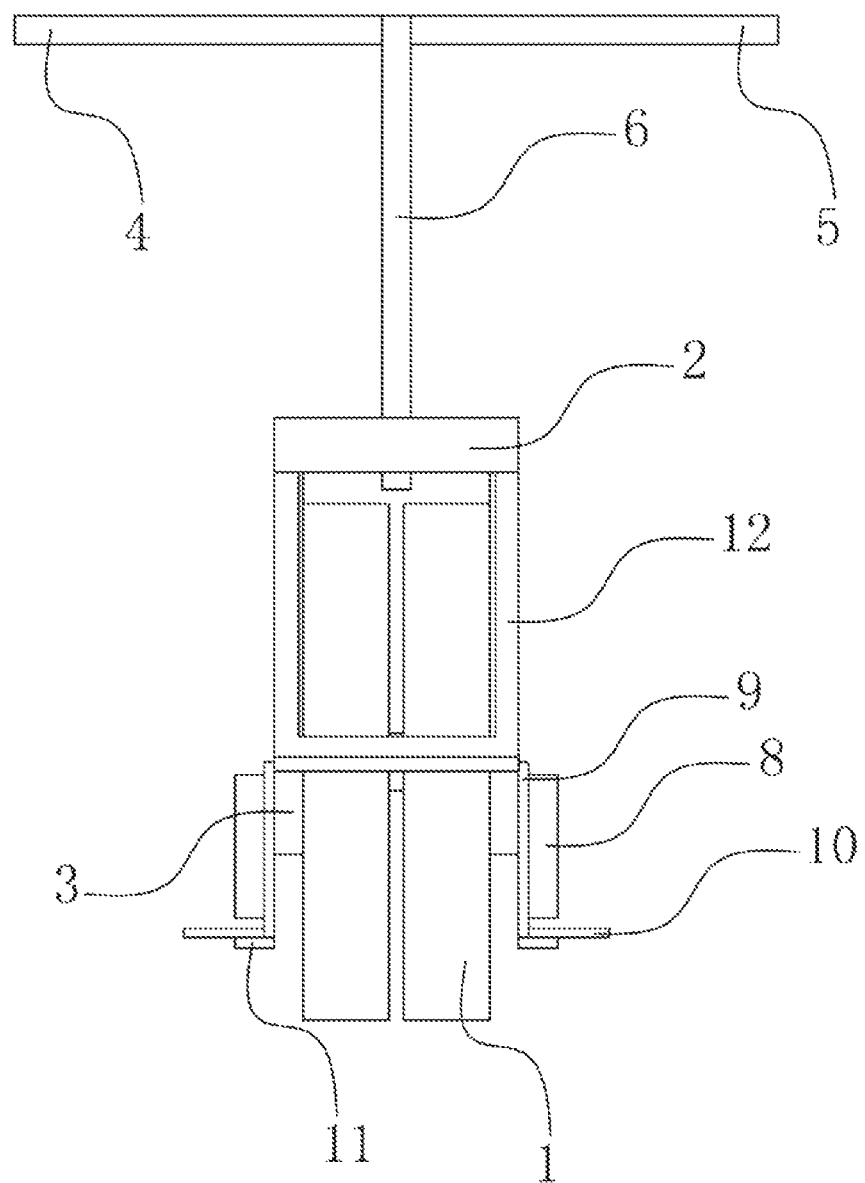
FIG. 4 is a rear view of the present invention.

As shown in FIGS. 1, 2, 3 and 4, a single-wheel electric balancing scooter includes a wheel 1, a driving motor 13 located within the wheel 1 and a battery pack 14 serving as a power supply of the driving motor. A saddle 2 is provided above the wheel 1. A rack 3 is provided on two sides of the wheel 1, and the rack 3 includes a left rack and a right rack which are located on the two sides of the wheel, respectively. The left rack and the right rack are of an inverted triangular structure, and a lower end of the left rack and a lower end of the right rack are fixed to two ends of the fixed shaft of the wheel by nuts, respectively. The saddle 2 spans over the left rack and the right rack.

A handle is provided on a front side of the wheel 1. The handle includes a horizontal portion and a vertical portion. The horizontal portion includes a left horizontal portion 4 and a right horizontal portion 5, the left horizontal portion 4 is connected in a foldable manner to the right horizontal portion 5, and the connection part of the left horizontal portion 4 and the right horizontal portion 5 is connected to an upper end of the vertical portion 6 by screws. A lower end of the vertical portion 6 is connected in a foldable manner to the rack 3.

A front end of the rack 3 is connected with an auxiliary wheel rack 7. The auxiliary wheel rack includes a left auxiliary wheel rack and a right auxiliary wheel rack, which are parallel to each other. An auxiliary wheel 8 is provided at a lower end of the left auxiliary wheel rack and a lower end of the right auxiliary wheel rack, respectively. An upper end of the left auxiliary wheel rack and an upper end of the right auxiliary wheel rack are connected in a foldable manner to the rack 3, respectively. A distance $S_1$ between the left auxiliary wheel rack and the right auxiliary wheel rack is equal to a transverse width $S_2$ of the rack. A lower edge of the auxiliary wheel 8 is higher than a lower edge of the wheel 1.

A pedal assembly, designed for a driver to step on during driving, is provided on the rack 3 on the two sides of the wheel 1, respectively; and the pedal assembly consists of a backing plate 9 welded onto the rack 3 and a horizontal pedal 10 connected in a foldable manner to the backing plate 9. A stopper 11 is fixed to a lower end of the backing plate 9, and the stopper 11 corresponds to a position below the pedal 10; and an anti-skid slot is provided on the pedal.

A rear support 12 is provided at a rear end of the rack, 3 and a lower edge of the rear support 12 is higher than the lower edge of the wheel 1. The rear support 12 is of a rectangular structure, with an upper end of the rear support 12 being connected in a foldable manner to the rack 3; an included angle α between the rear support 12 and a vertical line is 15° to 45°; and the rear support 12 has a width $S_3$ equal to the transverse width $S_2$ of the rack.

A driver, who is to drive the single-wheel electric balancing scooter of the present invention, controls the leftward and rightward balance of the single-wheel electric balancing scooter by gripping the left horizontal portion 4 and the right horizontal portion 5 of the handle, while sitting on the saddle 2 with his/her feet stepping on the pedal 10. When power-off happens, the single-wheel electric balancing scooter may slide in the aid of the auxiliary wheel at the lower end of the auxiliary wheel rack 7, so as to ensure the safety. When getting off the scooter, the driver may tilt the scooter body so that the rear support 12 contacts the ground to keep the balance of the scooter body. When the driver is not planned to drive the single-wheel electric balancing scooter, he/she may drag it by using the handle. Since the wheel 1 of the single-wheel electric balancing scooter is much larger than usual wheels of luggage, the force required by dragging the single-wheel electric balancing scooter is much less than that required by dragging common luggage. If the scooter needs to be put in a car trunk, the rear support 12, the pedal 10, the auxiliary rack 7, the vertical portion 6 of the handle, the left horizontal portion 4 of the handle, the right horizontal portion 5 of the handle may be folded first, and the whole scooter is then put in the car trunk.

What is claimed is:

1. A single-wheel electric balancing scooter, comprising a wheel, a driving motor located within the wheel, a battery pack serving as a power supply of the driving motor, characterized in that a saddle is provided above the wheel; the saddle is mounted on a rack which is connected and fixed to a fixed shaft of the wheel; a handle is provided on a front side of the wheel, with a lower end of the handle being connected to the rack; and a front end of the rack is connected with an auxiliary wheel rack, with an upper end of the auxiliary wheel rack being connected in a foldable manner to the front end of the rack and an auxiliary wheel being provided at a lower end of the auxiliary wheel rack.

2. The single-wheel electric balancing scooter according to claim 1, characterized in that the auxiliary wheel rack comprises a left auxiliary wheel rack and a right auxiliary wheel rack, which are parallel to each other, and an auxiliary wheel is provided at a lower end of the left auxiliary wheel rack and a lower end of the right auxiliary wheel rack, respectively.

3. The single-wheel electric balancing scooter according to claim 1, characterized in that an upper end of the left auxiliary wheel rack and an upper end of the right auxiliary wheel rack are connected in a foldable manner to the rack, and a distance between the left auxiliary wheel rack and the right auxiliary wheel rack is equal to a transverse width of the rack.

4. The single-wheel electric balancing scooter according to claim 1, characterized in that a lower edge of the auxiliary wheel is higher than a lower edge of the wheel.

5. The single-wheel electric balancing scooter according to claim 2, characterized in that a lower edge of the auxiliary wheel is higher than a lower edge of the wheel.

6. The single-wheel electric balancing scooter according to claim 3, characterized in that a lower edge of the auxiliary wheel is higher than a lower edge of the wheel.

7. The single-wheel electric balancing scooter according to claim 1, characterized in that the rack comprises a left rack and a right rack, which are located on two sides of the wheel, respectively, both the left rack and the right rack are of an inverted triangular structure, and a lower end of the left rack and a lower end of the right rack are fixed to two ends of the fixed shaft of the wheel, respectively; and the saddle spans over the left rack and the right rack.

8. The single-wheel electric balancing scooter according to claim 2, characterized in that the rack comprises a left rack and a right rack, which are located on two sides of the wheel, respectively, both the left rack and the right rack are of an inverted triangular structure, and a lower end of the left rack and a lower end of the right rack are fixed to two ends of the fixed shaft of the wheel, respectively; and the saddle spans over the left rack and the right rack.

9. The single-wheel electric balancing scooter according to claim 3, characterized in that the rack comprises a left rack and a right rack, which are located on two sides of the wheel, respectively, both the left rack and the right rack are of an inverted triangular structure, and a lower end of the left rack and a lower end of the right rack are fixed to two ends of the fixed shaft of the wheel, respectively; and the saddle spans over the left rack and the right rack.

10. The single-wheel electric balancing scooter according to claim 1, characterized in that a pedal assembly, designed for a driver to step on during running, is provided on the rack on the two sides of the wheel, respectively; and the pedal assembly consists of a backing plate connected to the rack and a horizontal pedal.

11. The single-wheel electric balancing scooter according to claim 2, characterized in that a pedal assembly, designed for a driver to step on during running, is provided on the rack on the two sides of the wheel, respectively; and the pedal assembly consists of a backing plate connected to the rack and a horizontal pedal.

12. The single-wheel electric balancing scooter according to claim 3, characterized in that a pedal assembly, designed for a driver to step on during running, is provided on the rack on the two sides of the wheel, respectively; and the pedal assembly consists of a backing plate connected to the rack and a horizontal pedal.

13. The single-wheel electric balancing scooter according to claim 10, characterized in that the pedal is connected in a foldable manner to the backing plate; a stopper is fixed to a lower end of the backing plate, and the stopper corresponds to a position below the pedal; and an anti-skid slot is provided on the pedal.

14. The single-wheel electric balancing scooter according to claim 1, characterized in that a rear support is provided at a rear end of the rack, and a lower edge of the rear support is higher than the lower edge of the wheel.

15. The single-wheel electric balancing scooter according to claim 2, characterized in that a rear support is provided at a rear end of the rack, and a lower edge of the rear support is higher than the lower edge of the wheel.

16. The single-wheel electric balancing scooter according to claim 3, characterized in that a rear support is provided at a rear end of the rack, and a lower edge of the rear support is higher than the lower edge of the wheel.

17. The single-wheel electric balancing scooter according to claim 1, characterized in that the rear support is of a rectangular structure, with an upper end of the rear support being connected in a foldable manner to the rack; an included angle $\alpha$ between the rear support and a vertical line is 15° to 45°; and the rear support has a width the same as that of the rack.

18. The single-wheel electric balancing scooter according to claim 2, characterized in that the rear support is of a rectangular structure, with an upper end of the rear support being connected in a foldable manner to the rack; an included angle $\alpha$ between the rear support and a vertical line is 15° to 45°; and the rear support has a width the same as that of the rack.

19. The single-wheel electric balancing scooter according to claim 3, characterized in that the rear support is of a rectangular structure, with an upper end of the rear support being connected in a foldable manner to the rack; an included angle $\alpha$ between the rear support and a vertical line is 15° to 45°; and the rear support has a width the same as that of the rack.

20. The single-wheel electric balancing scooter according to claim 1, characterized in that the handle comprises a horizontal portion and a vertical portion; the horizontal portion comprises a left horizontal portion and a right horizontal portion, the left horizontal portion is connected in a foldable manner to the right horizontal portion, and the connection part of the left horizontal portion and the right horizontal portion is connected to an upper end of the vertical portion; and a lower end of the vertical portion is connected in a foldable manner to the rack.

* * * * *